US008787756B2

(12) United States Patent
Bogoni et al.

(10) Patent No.: US 8,787,756 B2
(45) Date of Patent: Jul. 22, 2014

(54) ALL OPTICAL BATCHER BANYAN SWITCH, BATCHER SWITCH, BANYAN SWITCH AND CONTENTION MANAGER

(75) Inventors: Antonella Bogoni, Montova (IT); Luca Poti, Pisa (IT); Nicola Andriolli, Pisa (IT); Mirco Scaffardi, Parma (IT); Gianluca Berrettini, Lappato (IT); Piero Castoldi, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1418 days.

(21) Appl. No.: 12/183,637

(22) Filed: Jul. 31, 2008

(65) Prior Publication Data

US 2009/0060501 A1 Mar. 5, 2009

(30) Foreign Application Priority Data

Jul. 31, 2007 (EP) .................. PCT/EP2007/057880

(51) Int. Cl.
*H04J 14/00* (2006.01)
*H04B 10/00* (2013.01)

(52) U.S. Cl.
USPC .............................................. 398/54; 398/45

(58) Field of Classification Search
CPC .............. H04Q 2011/0001; H04Q 2011/0037; H04Q 2011/0041; H04Q 2011/005
USPC ........................... 398/57, 45, 51, 54; 359/108
See application file for complete search history.

(56) References Cited

U.S. PATENT DOCUMENTS

2001/0020854 A1* 9/2001 Buck ............................... 327/26
2002/0005857 A1* 1/2002 Kasahara et al. ............. 345/611
2002/0152418 A1* 10/2002 Griffin et al. ................... 714/11
2003/0058527 A1* 3/2003 Kim et al. ..................... 359/344
2004/0213570 A1* 10/2004 Wai et al. ........................ 398/49
2006/0092501 A1* 5/2006 Byun et al. .................... 359/333

FOREIGN PATENT DOCUMENTS

WO 94/21088 9/1994

OTHER PUBLICATIONS

Prucnal, P. R. et al. "Optically-Processed Routing for Fast Packet Switching." IEEE Transactions on Paralled and Distributed Systems, vol. 1, No. 2, May 1990, pp. 54-67. XP000128312.
Prucnal, P. R. "Optically Processed Self-Routing, Synchronization, and Contention Resolution for 1-D and 2-D Photonic Switching Architectures." IEEE Journal of Quantum Electronics, vol. 29, No. 2, Feb. 1993, pp. 600-612. XP000349810.
Maeda, S. et al. "Optical Multiplex Computing Based on Set-Valued Logic and Its Application to Parallel Sorting Networks." IEICE Transactions on Information and Systems, vol. E76-D, No. 5, May 1993, pp. 605-615. XP000322130.
Berrettini, G. et al. "Ultra-Fast Integrable 2×2 All-Optical Switch for Optical Packet Routing." In Proc. ECOC 2006. Cannes, France, Sep. 24-28, 2006, paper No. We3P102.

(Continued)

*Primary Examiner* — Daniel Dobson
(74) *Attorney, Agent, or Firm* — Coats & Bennett, PLLC

(57) ABSTRACT

An all-optical contention manager includes at least two inputs and at least two outputs. The outputs are configured to output signals to a Banyan switch. The contention manager detects and resolves routing contentions between incoming optical signals prior to outputting the signals to the Banyan switch. The signals have tags that include routing information. A photonic comparator in the contention manager compares the tags of incoming optical signals in order to detect contention.

7 Claims, 6 Drawing Sheets

(56) References Cited

OTHER PUBLICATIONS

Bogoni, A. et al. "A Synchronous All-Optical 160 Gb/s Photonic Interconnection Network." 2007 Conference on Optical Fiber Communication and the National Fiber Optic Engineers Conference. Anaheim, CA, Mar. 25-29, 2007, pp. 1-3.

Hill, M. T. et al. "All-Optical Flip-Flop Based on Coupled Laser Diodes." IEEE Journal on Quantum Electronics, vol. 37, No. 3, Mar. 2001, pp. 405-413.

Shacham, A. et al. "A Fully Implemented 12×12 Data Vortex Optical Packet Switching Interconnection Network." Journal of Lightwave Technology, vol. 23, No. 10, Oct. 2005, pp. 3066-3075.

Scaffardi, M. et al. "Photonic Combinatorial Network for Contention Management in 160 Gb/s—Interconnectoin Networks Based on All-Optical 2×2 Switching Elements." IEEE Journal of Selected Topics in Quantum Electronics, vol. 13, No. 5, Sep./Oct. 2007, pp. 1531-1539.

Scaffardi, M. et al. "All-Optical Comparator Based on Cross Gain Modulation in Semiconductor Optical Amplifiers." In Proc. OFC 2008. San Diego, CA, US, Feb. 24-28, 2008, paper No. JWA79.

Tangdiongga, E. et al. "640-to-40 Gb/s All-Optical Demultiplexing using a Single SOA Assisted by an Optical Filter." In Proc. IEEE-LEOS 2006. Montreal, Canada, Oct. 29-Nov. 2, 2006, paper No. PD1.6.

\* cited by examiner

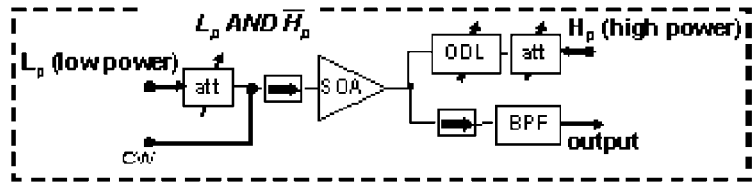
Fig. 4
| Lp | Hp | CW | Output |
|---|---|---|---|
| 0 | 0 | 1 | 0 |
| 1 | 0 | 1 | 1 |
| 0 | 1 | 1 | 0 |
| 1 | 1 | 1 | 0 |
Fig. 6
Fig. 7
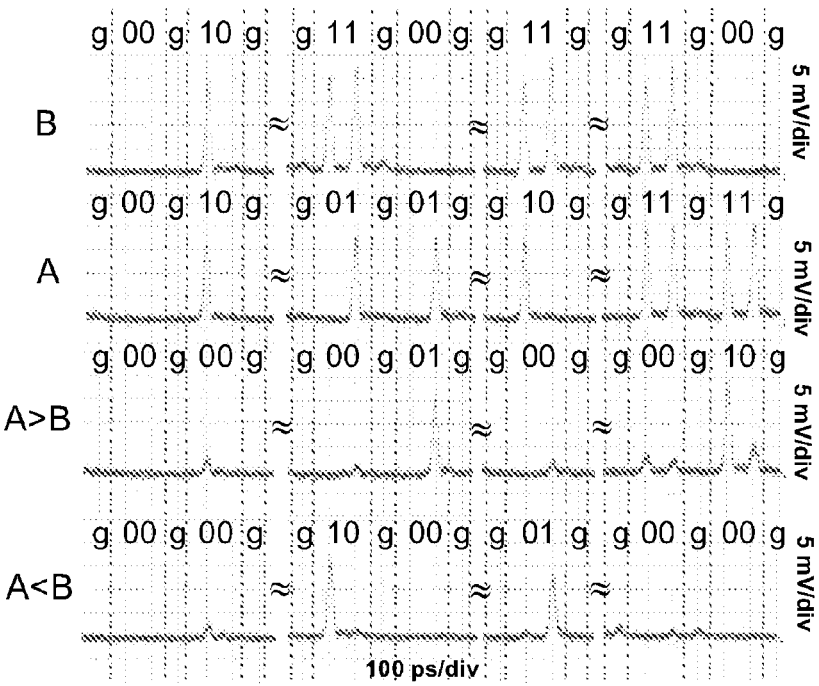

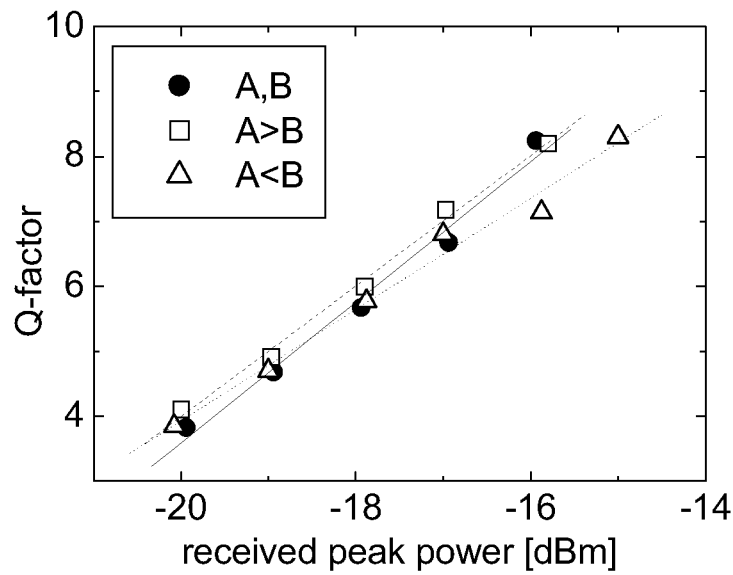
Fig. 8
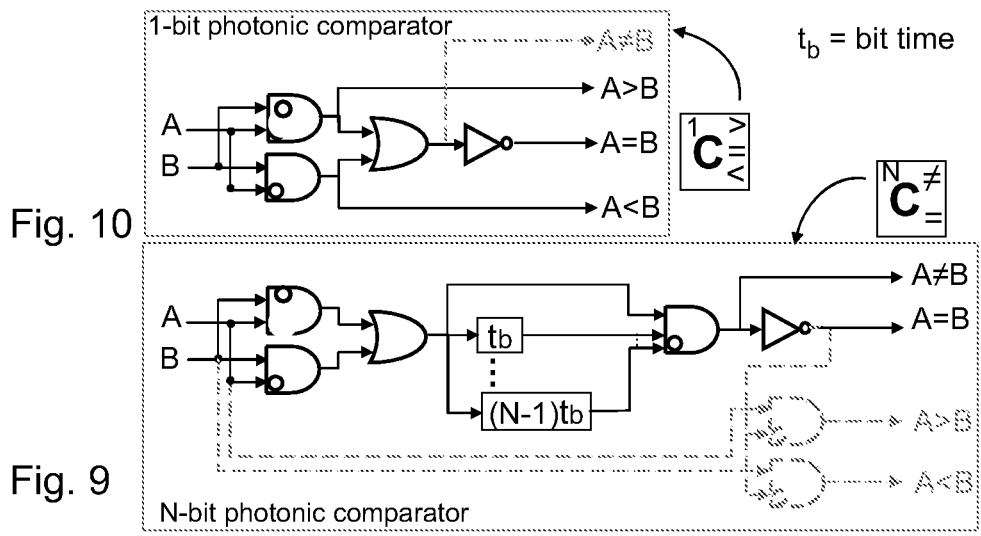
Fig. 10
Fig. 9

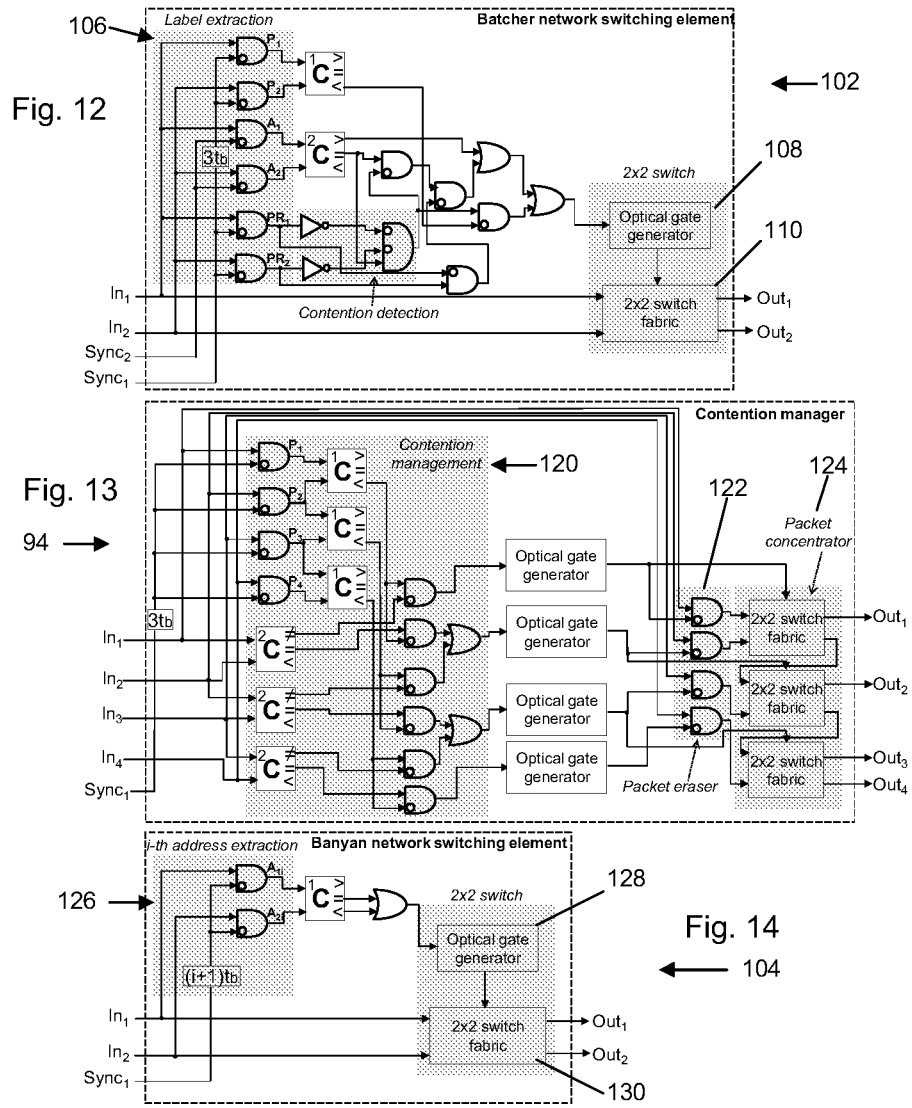

An optical Batcher Banyan switch, Batcher switch, Banyan switch and contention manager are provided. The contention manager, Batcher switch and Banyan switch are connected together to form the Batcher Banyan switch. The contention manager receives incoming optical signals having tags associated therewith, the tags including routing information. The contention manager detects and resolves routing contentions based on the routing information. The Batcher switch sorts the optical signals output from the contention manager into a desired order based on the routing information. The Banyan switch routes the optical signals output from the Batcher switch to a desired output based on the routing information.

ALL OPTICAL BATCHER BANYAN SWITCH, BATCHER SWITCH, BANYAN SWITCH AND CONTENTION MANAGER

CROSS REFERENCE TO RELATED APPLICATIONS

This application claims priority from PCT application PCT/EP2007/057880 entitled, "All Optical Batcher Banyan Switch, Batcher Switch, Banyan Switch, and Contention Manager." That application was filed on Jul. 31, 2007 and is incorporated herein by reference in its entirety.

TECHNICAL FIELD

The present invention relates to optical Batcher Banyan switches, optical Batcher switches, optical Banyan switches, and optical contention managers.

BACKGROUND

Electronic Batcher Banyan networks are known.

A Banyan network is a self routing network. That is, a packet sent across the Banyan network reaches its correct, desired destination without the need for an additional controller. Each packet that is input to the Banyan network contains sufficient information, e.g. in a header, to be able to route the packet to its desired destination based on an analysis of the information at component switches within the Banyan network.

Referring to FIG. 1 (prior art), a 2×2 Banyan switch 10 is shown—i.e. it has 2 inputs and 2 outputs. The switch 10 is a component switch in a Banyan network, and reads the relevant bit, e.g. the most significant bit (MSB), in a destination tag contained in a header of a packet being sent across the Banyan network. When the packet is being processed through the switch 10, if the MSB is 0, the packet is routed to the first output. If the MSB is 1, the packet is routed to the second output.

An n×n Banyan network can be constructed from log 2n layers of switches. Thus, a packet sent through an n×n Banyan network should have log 2n bits in its destination tag. The switch 10 reads the relevant bit in the destination tag. For example, this may be the MSB in a first stage of the n×n Banyan network followed by the next MSB (i.e., MSB-1) at the next stage and so on.

A problem associated with component switches within a Banyan network is that two packets having the same relevant bit, e.g. MSB, can overlap at a particular component switch. For example, the packets can arrive at the inputs of the switch 10 at the same time. When the switch 10 tries to send both packets to the same output, a collision occurs. As a result data can be lost. It is known to pre-sort packets prior to processing through a Banyan network. The packets are pre-sorted according to their destination tag information.

This pre-sorting can be carried out by a Batcher network (electronic Batcher networks are known). A Batcher network comprises component switches (see FIG. 2), which interrogate the destination tag of 2 incoming packets, for example, and compare them. A packet having a higher value destination tag is routed to the first output and a packet having a relatively low value destination tag is routed to the second output.

When a Batcher network is employed to sort packets prior to a Banyan network, the networks are usually both of the same size. For example, a 4×4 Batcher network will precede a 4×4 Banyan network.

The Batcher network will sort the data packets into an order, which avoids collisions as the packets are processed through the Banyan network. Thus a Batcher Banyan network is provided.

SUMMARY

According to an aspect of the invention, there is provided a Batcher Banyan network, Batcher switch, Banyan switch, or a contention manager.

The contention manager is an all-optical contention manager having at least two inputs and two outputs. The outputs are connected to a Banyan switch to allow the contention manager to output optically processed optical signals to the Banyan switch. Prior to outputting the optical signals, the contention manager detects and resolves routing contentions based on routing information included with tags that are carried by each incoming optical signal. In one embodiment, the contention manager includes at least one photonic comparator that compares the tags to detect contention. The photonic comparator includes a semiconductor optical amplifier that processes the incoming optical signals entirely optically.

The Batcher switch is an all-optical Batcher switch having at least two inputs and two outputs. The Batcher switch sorts incoming optical signals into a desired order for output based on the routing information included with the tags. The Batcher switch may also include a photonic comparator configured to compare the tags and route the optical signals based upon the tag comparison. The Batcher switch includes a semiconductor optical amplifier that processes the signals entirely optically.

The Banyan switch is an all-optical Banyan switch having at least two inputs and at least two outputs. The Banyan switch receives the optical signals output by the contention manager, and routes them to a desired output based on the routing information included with the tags. The Banyan switch comprises at least one photonic comparator to compare the tags from different optical input signals to correctly route them to the desired output. The photonic comparator may be, for example, a semiconductor optical amplifier configured to perform optical signal processing.

In addition, the contention manager, the Banyan switch, and the Batcher switch may be used to form an all-optical Batcher Banyan network configured to process the optical signals. The contention manager would detect and resolve routing contentions between incoming optical signals based on the routing information included in the tags. The Batcher switch would sort the optical signals into a desired order for output based on the routing information. The Banyan switch would route the optical signals to the desired output based on the routing information.

BRIEF DESCRIPTION OF THE DRAWINGS

Embodiments of the present invention will now be described, by way of example only, with reference to the accompanying drawings, in which:

FIG. 4 is a schematic illustration of an optical gate that can be used as a building block to implement the comparator of FIG. 3.

FIG. 6 is a truth table for the logic gate of FIG. 4.

FIG. 7 illustrates a representative set of output patterns obtained from the circuit of FIG. 3 together with the input words A and B used.

FIG. 8 plots Q factor against received peak power for A>B and A<B compared with the Q factor of the inputs A and B.

FIG. 9 shows an N-bit photonic comparator logic circuit.

FIG. 10 shows a I-bit photonic comparator logic circuit.

FIG. 12 shows a Batcher switch used in the network of FIG. 11.

FIG. 13 shows a contention manager used in the network of FIG. 11.

FIG. 14 shows a Banyan switch used in the network of FIG. 11.

DETAILED DESCRIPTION

Figure 1:
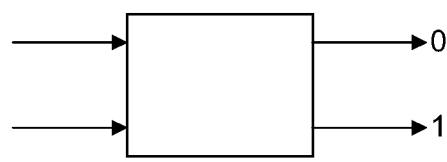
FIG. 1 schematically shows a prior art Banyan switch.
Figure 2:
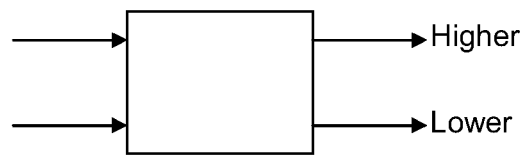
FIG. 2 schematically shows a prior art Batcher switch.
Figure 3:
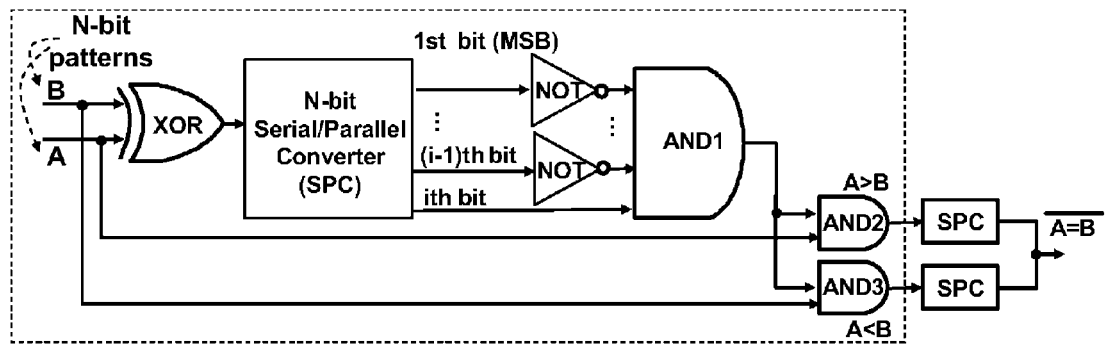
FIG. 3 is an overview of an optical logical comparator for comparing two N-bit words, where N is greater than 1.

An all optical N-bit comparator is shown in FIG. 3. The comparator receives as its input a pair of N-bit words A and B. The comparator comprises a combination of optical logic gates and delay lines which together provide as an output the logical functions A>B, A<B and A=B.

The first stage of the optical circuit is an XOR gate to which each pair of corresponding bits $A_k$, $B_k$, with k=1 ... N, of the signals A, B are passed in sequence. By this we mean that at a first instance, the most significant bits $A_1$ and $B_1$ are input to the comparator to give a first output C1, then the next bits $A_2$, $B_2$ to give and output $C_2$, and so on until the least significant bits $A_k$, $B_k$, with k=N, are passed to the XOR gate to give an output $C_k$=N. There will therefore be N results for $C_k$ (where k=1 to N) produced in a sequence at the output of the XOR gate.

If two bits $A_k$, $B_k$ passed to the XOR gate at any sampling interval are the same, then the output Ck of the XOR gate will be logic 0. It will be logic 1 if they are different. For any given pair of N bit numbers there will therefore be a corresponding N bit number C produced with a 1 for each pair of bits that do not match and a 0 for each pair that do match. It should be noted that this number C does not provide any information indicative of which of the words A, B is largest.

The next stage of the comparator circuit is an AND gate, which is provided with N inputs. The first input to the AND gate is connected to the output of the XOR gate. The second input is also connected to the output of the XOR gate but this time through an inverter and a delay line. The inverter and delay line provide a delay that is equal to the time between values of C being output from the XOR gate. The third input is connected to the output of the XOR gate also through an inverter and a delay line, but this time the delay provided is twice that used for the second input. This pattern is repeated for each input to the AND gate until the Nth input is connected to the output of the XOR gate through a delay line equal to N−1 times the first delay time Thus, as the first output bit $C_1$ of the XOR gate is produced it is passed to the first input of the AND gate. At this time, no signals are applied to the other inputs to the AND gate (since there are no previous delayed signals to be presented). Therefore, the output of the AND gate will be equal to the first bit $C_1$. As the next output $C_2$ is provided from the XOR gate, it is applied to the first input of the AND gate, and by this time the first bit $C_1$ will have rippled through to the second input of the AND gate. Because one of the inputs is inverted and the other not, the output of the AND gate will be 1 if C1 is 0 and $C_2$ is 1. Otherwise, the output of the AND gate will be 0. This process is then repeated for each of the N samples Ck, giving N output signals $D_k$ (with k=1 to N) from the AND gate. Note that as soon as one pair of inputs to the XOR gate do not match, then the output of the AND gate is 1. For all subsequent samples it will be 0.

The output of the AND gate will therefore be an N-bit word D where, starting with the most significant bit of the word D, it will contain zeros until the value of $C_k$ is 1.

To determine whether A>B, each output from the first AND gate is next coupled to a second AND gate. Both the output Dk and the current bit of A are input into the second AND gate (i.e., for each output Dk input into the second AND gate, where k=m, bit $A_k$ is also input into the second AND gate with k=m). If the current bit of A is 1, and the output of the first AND gate is 1, then this indicates that A>B. If they do not match, then A is either equal to B or less than B.

To determine whether A<B, each output from the first AND gate is next coupled to a third AND gate. Both the output Dk and the current bit of B are input into the second AND gate (i.e., for each output Dk input into the third AND gate, where k=m, bit $B_k$ is also input into the third AND gate with k=m) will be fed to the AND gate. If the current bit of B is 1, and the output of the first AND gate is 1, then this indicates that A<B. If they do not match, then A is either equal to B or greater than B.

Having determined both A<B and A>B the outputs of the second and third AND gates can then be coupled through an OR gate to determine whether A=B.

Note that in place of the first and second AND gates, a gate performing the function X AND NOT Y can be used if the Y input is previously inverted.

A practical embodiment of the comparator of FIG. 3 can be realised using a set of semiconductor optical amplifiers configured to provide logical building blocks or logic gates. A suitable gate which provides the functionality A AND NOT B is shown in FIG. 4. As will become apparent, this can be used to give the function XOR and AND as required.

Each gate comprises a single semiconductor optical amplifier (SOA) having a first input at one end and a second input at the other. The output from the amplifier is taken to be the signal that passes out of the second end of the amplifier. A characteristic of SOA's is that a gain is applied to an input signal, which is influenced by the power of the signals input to the amplifier. As the input power increases, the gain eventually starts to decrease. Another characteristic is that SOA's are non-linear devices. Thus, a signal at one wavelength is able to modulate a signal at another wavelength using a well known process of cross gain modulation (XGM).

Coupled to the first end of the amplifier is a continuous wave signal CW of relatively high power and a first, lower power, input signal $L_p$. Coupled to the second end is a second, high power, input signal $H_p$. The two input signals have the same wavelength but the CW is at a different wavelength.

The two counter-propagating input signals interact in the SOA so that the low power signal $L_p$ experiences the gain modulation induced by the stronger second input signal $H_p$. The CW allows keeping the gain saturation high, thus reducing the SOA recovery time. In effect, this means that with no high power signal applied ($H_p$=0), the output will be 1 when $L_p$=1 and 0 when $L_p$=0. On the other hand, when the high power signal $H_p$=1 is applied, the low power signal $L_p$ experiences a strongly reduced SOA gain, producing an output at all times on 0. The output from the gate therefore corresponds to the function ($L_p$ AND NOT $H_p$). This is shown in the truth table of FIG. 6 of the accompanying drawings.

Figure 5:
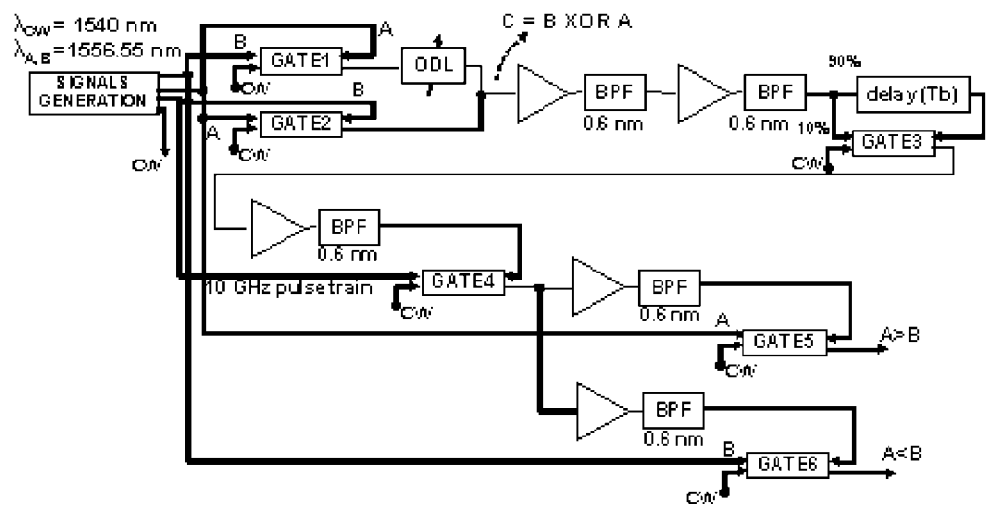
FIG. 5 is a detailed view of an embodiment of an optical circuit in accordance with the first aspect of the present invention.

Turning to FIG. 5, the six gates, each configured as shown in FIG. 4, can be connected to form a circuit that accepts the two N-bit numbers as input, and provides outputs for A>B, A<B, and NOT A=B. The gates can be identical, which eases the design burden The first part of the circuit of FIG. 3—i.e., the XOR gate—is implemented in FIG. 5 by passing signals A and B to the first and second inputs of a first gate (Gate 1) to produce an output corresponding to the logical function (A and NOT B). The same signals A and B are also input to the second and first inputs, respectively, of a second gate (Gate 2) to produce an output corresponding to the function (B and NOT A). The output of the Gates 1 and 2 is then combined using a fiber coupler tail (to provide an OR function) so as to provide the function (A and NOT B) OR (B and NOT A), which is the same as the function (A XOR B).

The fiber coupler tail output signal is next input to the first input of a third gate (Gate 3). A delayed version of the same fiber coupler tail output signal is input to the second input of Gate 3. In fact, for an N-bit word there will be N−1 delayed versions fed to the second input, each delayed by one or more samples. Only one delayed input is shown in FIG. 5 for clarity. The output of Gate 3 will therefore represent the first AND gate function of the circuit of FIG. 3. Note that no additional inverters are needed in this case since the function of Gate 3 provides the required inversion of the second input.

The output from Gate 3 is then passed to the second input of another gate, Gate 4. A pulse train synchronised to the sample rate is fed to the first input of Gate 4, so that the output of Gate 4 is an inverted version of the signal fed to the second input of Gate 4 (i.e., the output of Gate 4 is an inverted version of the signal output by Gate 3).

The signal output from Gate 4 is then fed to the second input of Gates 5 and 6. The first input of gate 5 is provided with the signal $A_n$ as its input, and thus, produces an indication of A>B as its output. The first input of Gate 6 is provided with $B_n$ as its input, and thus, this gate produces an indication of A<B as its output.

The output from each gate can be passed though an amplifier as required before being fed to a subsequent gate. Additionally, the output from each gate may also be passed through a bandpass filter.

In an experimental arrangement to verify the operation of the circuit of FIG. 5, N bit signals A and B of wavelength 1556.55 nm were used with a continuous wave signal applied to each SOA of 1540 nm. Bandpass filters of 0.6 nm bandwidth were used to filter the outputs from each gate.

FIG. 7 shows the output patterns A>B and A<B together with the corresponding input patterns B and A. The guard bit between two patterns is labelled as g. If A and B are matched, the output is 00 both for A>B and A<B. If A is higher than B, the output A>B becomes 1 as the first mismatch occurs. The other bit is 0. A correct behaviour is observed also for A<B, thus demonstrating that the scheme works properly.

The extinction ratio is higher than 4.6 dB for A>B, and higher than 6 dB for A<B. Since the extinction ratio for the input patterns A and B is higher than 6.3 dB, the penalty introduced by the 2-bit comparator is 1.7 dB for A>B and 0.3 dB for A<B. The different penalties are mostly due to the different characteristics of the SOAs in Gate 5 and Gate 6.

FIG. 8 summarizes the performance in terms of Q-factor as a function of the received peak power for the output signals A>B and A<B, compared with the Q-factor of the input patterns A and B. The Q-factor is calculated using the statistics of the noise on the one and zero levels taken with a 50 GHz-bandwidth oscilloscope. The receiver is a pre-amplified receiver. The penalty with respect to the back-to-back, measured at Q=6, is negligible both for A>B and A<B. The penalty of the signal $\overline{A=B}$ is expected to be comparable, because this signal is obtained directly from A>B and A<B (see FIG. 3). The extinction ratio degradation should be dominated by the degradation induced by A>B.

There is therefore provided a specific scalable circuit for comparing two N-bit words (Boolean numbers) which uses 6 identical optical gates and a set of N−1 delay lines). Each gate uses one SOA with counter-propagating signals exploiting cross gain modulation. From this scalable circuit, the above-mentioned architecture is achieved as described.

The N-bit photonic comparator can also be represented diagrammatically as shown in FIG. 9.

Referring to FIG. 10 a 1-bit photonic comparator is illustrated and constructed according to the same underlying SOA architecture for equivalent logic gates. It will be appreciated that the 1 bit comparator comprises a simpler circuit since no delay lines need to be present in order to process information from different bits as with the previously described N-bit comparator In an embodiment of this invention, there is provided a Batcher network which uses the comparators shown in FIGS. 9 and 10. In another embodiment of the invention, there is provided a Banyan network that uses the comparator shown in FIG. 10. In a further embodiment there is provided a contention manager (whose purpose is described in further detail below) which uses the comparators of FIGS. 9 and 10.

In another embodiment, there is provided a Batcher Banyan switch network. This combines the above mentioned Batcher network, contention manager and Banyan network.

Figure 11:
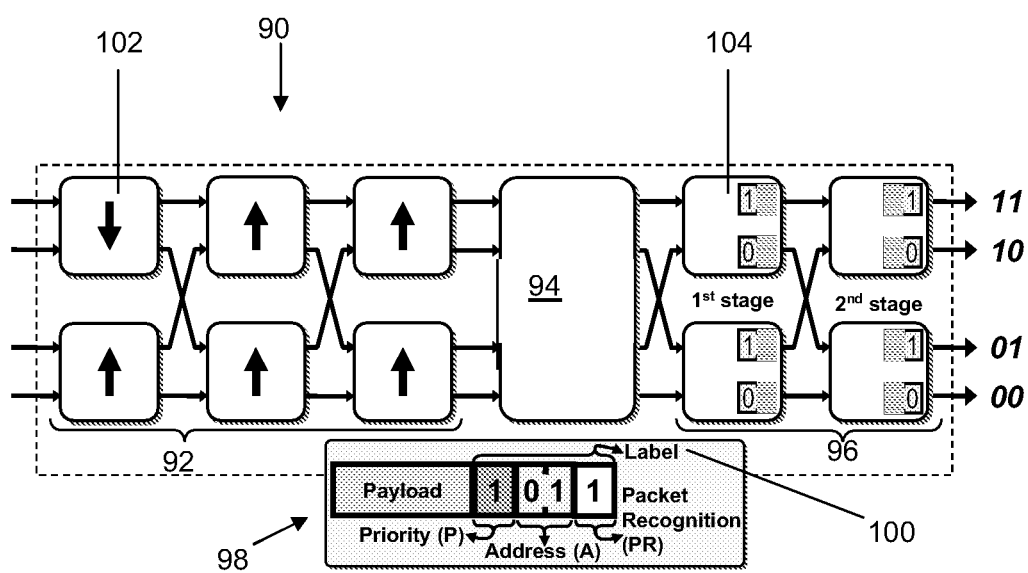
FIG. 11 is a schematic diagram of a Batcher Banyan network according to an embodiment of this invention.

For example, as seen in FIG. 11, a Batcher Banyan switch network 90 configured according to one embodiment of the present invention comprises four inputs and four outputs. Both the inputs to and the outputs of the Batcher Banyan switch network are optical signals. All processing within the Batcher Banyan network is all optical.

The first stage of the Batcher Banyan network 90 comprises a Batcher sorting network 92. The Batcher sorting network is arranged to sort incoming optical signals into ascending order. In other embodiments, the Batcher sorting network may be arranged to sort incoming optical signals into descending order.

Optical signals, once they have been sorted by the Batcher network 92, are input into a contention manager 94. The contention manager 94 is configured to deal with possible contentions (e.g., undesired signal routing that may lead to collisions in the subsequent, Banyan network). Output signals from the contention manager 94 are passed to a Banyan network 96 which is configured to route the optical signals to a desired output.

In this embodiment, an optical signal 98, which is required to be processed, comprises a bit payload and a label (or tag) 100. The label/tag 100 comprises a priority bit (P) to indicate whether the signal 98 is to have priority over other signals, a two bit address (A) which provides information on the desired end output address, and a packet recognition bit (PR).

Together, the priority bit (P), the address bit (A) and the packet recognition bit (PR) form the destination tag or label 100. The label 100 includes the destination information that can be processed by the individual components of the Batcher Banyan switch network 90 to ensure that the optical signal 98 is correctly routed. In other embodiments the label 100 may comprise only some of these components or may contain additional components.

In this embodiment, the Batcher sorting network 92 comprises a series of 3 by 2 (3×2) (i.e. a total of 6) Batcher sorting switches 102. Each switch 102 has two inputs and two outputs.

The contention manager 94 has four inputs and four outputs. Therefore, there are two Batcher switches 102 immediately preceding the contention manager 94. The Banyan network comprises a 2×2 array of Banyan switches 104. Each Banyan switch 104 comprises two inputs and two outputs, and thus, there are two Banyan switches 104 immediately following the contention manager.

Referring to FIG. 12, a Batcher switch 102 is shown in more detail.

The logic functions depicted in FIGS. 12 to 14 are readily achievable using SOA modules and circuits as described in detail above.

The Batcher switch 102 receives two input signals, $In_1$ and $In_2$. The input signals are initially sent to a label extraction circuit 106. Within the label extraction circuit 106, the destination label 100 is interrogated such that the priorities, $P_1$ and $P_2$ of the input signals $In_1$ and $In_2$ are compared, the addresses $A_1$ and $A_2$ of the input signals are compared, and the packet recognition bits $PR_1$ and $PR_2$ of the input signals are compared. In the label extraction circuit 106, the relevant bits are extracted and separated.

When comparing the priority bits, $P_1$ and $P_2$, the separated priority bits, $P_1$ and $P_2$ are input into the two inputs of a one bit photonic comparator (e.g., as seen previously in FIG. 10). In this way it is determined whether or not $P_1$ is greater than $P_2$, $P_1$ is less than $P_2$, or $P_1$ equals $P_2$.

Similarly, the address bits, $A_1$ and $A_2$, from the two signals are passed to the two inputs of a 2-bit photonic comparator (i.e., the photonic comparator illustrated in FIG. 9 where N equals 2). It is thus determined whether or not $A_1$ equals $A_2$ (i.e., whether the desired destination addresses are the same), or whether the destination addresses are different.

If the output indicates that the destination addresses are different, i.e., $A_1$ does not equal $A_2$, then each signal, $In_1$, $In_2$ is passed to its correct, desired output via an optical gate generator 108 and switching fabric 110. The optical gate generator 108 can generate an optical gate for as long as is required in the optical domain. The switching fabric 110 can switch to a different output, $Out_1$ or $Out_2$ as required. For example, if $A_1$ contains destination information indicating that $A_1$ is greater than $A_2$, then in this embodiment, $Out_1$ is designated as being greater than $Out_2$, i.e., higher value addresses are routed to it such that when $A_1$ is greater than $A_2$, $A_1$ is routed to $Out_1$ and $A_2$ is routed to $Out_2$. There is no conflict.

In the scenario where there is a conflict, i.e., the address comparison determines that $A_1$ equals $A_2$, then the priority comparison becomes determinative. In this scenario, the higher priority signal will be routed to the correct, desired output, while the other, relatively lower priority signal will be routed to the remaining output. Therefore if $A_1$ equals $A_2$ but $P_1$ is greater than $P_2$ then $A_1$ will be routed to $Out_1$ and $In_2$ will be routed to $Out_2$.

In the scenario where $A_1$ equals $A_2$ and $P_1$ equals $P_2$, there is a default position in which $In_1$ is sent to $Out_1$ and $In_2$ is therefore sent to $Out_2$. This determination is made simply on the basis of the input port, $In_1$ taking precedent over the input port, $In_2$.

The Batcher switch 102 compares addresses $A_1$, $A_2$ of input signals $In_1$ and $In_2$, respectively, to determine whether address $A_1$ is greater than address $A_2$, or whether address $A_1$ is less than $A_2$, or whether $A_1$ equals $A_2$. The output port $Out_1$ and $Out_2$ are designated for outputting relatively high or low address signals. Therefore the Batcher sorting network 92 will sort incoming signals into ascending/descending order. All processing is carried out entirely in the optical domain and therefore, is very efficient. There is no time delay/distortion which arises as a result of undesirable conversion of optical signals into electrical signals.

The contention manager 94 comprises four inputs, $In_1$, $In_2$, $In_3$ and $In_4$, that receive optical signals after they have been sorted by the Batcher network 92. The incoming signals will be in ascending order in this embodiment. The contention manager comprises a contention management circuit 120. The contention management circuit 120 compares priority bits, $P_1$, $P_2$, $P_3$ and $P_4$ from the four input signals. The contention management circuit 120 also compares addresses, $A_1$, $A_2$, $A_3$, $A_4$ of the input signals. It is only necessary to compare adjacent input signals, i.e. $In_1$ with $In_2$, and $In_2$ with $In_3$, and $In_3$ with $In_4$. Therefore, only three comparisons need to be made in this example. This is because the signals are already in ascending order since they have been pre-sorted by the Batcher network.

Once again, when comparing priorities, the one bit photonic comparator of FIG. 10 is used. When comparing addresses, the two bit photonic comparator (where N equals 2 in the FIG. 9 comparator) is used.

If it is determined that there is contention, (i.e., more than one signal input desires to go to the same output $Out_1$, $Out_2$, $Out_3$ or $Out_4$), then the contention must be resolved. In the contention manager 94, the contention is resolved by a packet eraser 122. Particularly, the packet eraser 122 determines which signals have the highest priority. For any signals that require being output to the same address, the packet eraser 122 erases the lower priority signals. If both the desired destination address and the priority are identical for two input signals, then the identity of the input port is the determining factor in deciding which signal should be erased by the packet eraser 122. This is similar to the resolution in the Batcher switch, where the incoming signal at input port, is selected over the input signal at any of the other input ports. for example.

Considering an example in which a packet is erased from $Out_2$ in this embodiment, the result of the signals passing through the contention manager 94 is that there is an output at $Out_1$, an output at $Out_3$ and an output at $Out_4$ but no output at $Out_2$. It is known that it is not desirable to have an input to the Banyan network 96, which includes a gap within the output (the gap being at $Out_2$). It is more desirable to have a group of outputs that are grouped together without any gaps. If there must be one gap, then it is desirable that the gap is at one of the edges, either $Out_1$ or $Out_4$). Therefore, the contention manager 94 includes a packet concentrator 124 preceding the four output ports. The packet concentrator 124 is arranged to reorganize the packets once any contentions have been resolved so that they are output at output ports which are adjacent to each other without any gaps. This avoids any unnecessary undesirable behaviour in the Banyan network caused by interference due to having gaps within the arrangement of output signals from the contention manager 94.

All processing within the contention manager 94 is entirely in the optical domain. There is no conversion, at any point, of the optical signals into the electrical domain.

Referring to FIG. 14, a switch 104 of the Banyan switching network 96 is shown. The Banyan switch 104 initially comprises an address extraction module 126 that is configured to organize the address of the incoming signals into order by extracting the most significant bit (MSB), then the next most significant bit (i.e., the bit in position MSB-1), then the next (i.e., the bit in position MSB-2), etc. This is achieved using a delay line as previously described. The delay line in this embodiment effectively comprises increasing the distance over which the part of the signal to be delayed must travel relative to the distance over which the part of the signal which is not required to be delayed must travel.

The bits to be compared, (e.g., the most significant bit) $A_1$ and $A_2$ from each signal, are passed to the input of a one bit photonic comparator as shown in FIG. 10 to determine which is larger than the other. This is done in the successive stages for all of the bits within the addresses $A_1$, $A_2$ such that the desired destination address can be reached. The signals are then passed through an optical gate generator 128 and switching fabric 130 to route them to their desired outputs, $Out_1$ or $Out_2$. Prior to the Banyan network 96, the signals have been ordered and any contentions resolved as described above so that there is no contention in the Banyan network 96.

The processing within the Banyan network switches 104 is entirely optical. There is no conversion of any signal at any stage into the electrical domain.

Accordingly, in this embodiment, there is provided a highly modular architecture of an all optical interconnection network capable of forwarding fixed length optical packets up to 160 Gb/s. It comprises different configurations of a single discrete element exploiting cross gain modulation in semi conductor optical amplifiers. The solution which has been proposed is suitable for implementation as an integrated all optical chip, for example.

Various modifications may be made to the present invention without departing from its scope. For example different dimensions of Batcher, Banyan, contention manager, and Batcher Banyan networks may be provided using the principles of this invention. For example in the contention manager, it will be appreciated that (X−1) photonic comparisons are required to compare X incoming input signals. In the N bit photonic comparator of FIG. 9, as N increases and larger addresses need to be compared, there is no requirement for additional, complex component architecture. Advantageously the present invention provides for a system where extra delay lines simply need to be built into the comparator of FIG. 9. These are easily provided, for example by making an optical signal travel a further distance, a suitable delay line can be provided.

Therefore it will be appreciated that the system described above is efficiently and easily scalable.

The present invention may, of course, be carried out in other ways than those specifically set forth herein without departing from essential characteristics of the invention. Therefore, the present embodiments are to be considered in all respects as illustrative and not restrictive, and all changes coming within the meaning and equivalency range of the appended claims are intended to be embraced therein.

The invention claimed is:

1. An all-optical contention manager comprising:
   at least two inputs to receive optical input signals;
   at least two outputs configured to pass optical signals to a Banyan switch;
   a contention manager configured to detect and resolve routing contentions between the optical input signals prior to outputting the optical signals, the optical input signals comprising tags that include routing information, the contention manager comprising:
      at least one photonic comparator configured to compare the tags of the optical input signals to detect contention, each photonic comparator comprising a plurality of logic gates, and each gate having a single semiconductor optical amplifier configured to process the optical input signals entirely optically.

2. The contention manager of claim 1 wherein each tag comprises an address number (A), and wherein the contention manager is configured to detect contentions between optical signals by comparing their address numbers.

3. The contention manager of claim 2 wherein each tag further comprises a priority number (P), and wherein the contention manager is configured to detect contentions between signals by comparing their priority numbers if their address numbers are equal.

4. The contention manager of claim 1 further comprising at least one of an optical gate generator and a switch.

5. The contention manager of claim 1 wherein the contention manager comprises X inputs, where X is an integer number greater than 1, and wherein the contention manager comprises (X−1) comparators for comparing the X tags.

6. The contention manager of claim 1 further comprising a packet eraser configured to erase optical signals that are detected as being contentious.

7. The contention manager of claim 1 further comprising a packet concentrator configured to concentrate packets into adjacent output channels.

* * * * *